United States Patent [19]

Harney et al.

[11] 4,454,505

[45] Jun. 12, 1984

[54] DATA ENTRY SYSTEM FOR MICRO-COMPUTER BASED CONTROLLERS

[75] Inventors: Ralph P. Harney, Wonder Lake; Clifford E. Mensing, Glen Ellyn, both of Ill.

[73] Assignee: Intermatic Incorporated, Spring Grove, Ill.

[21] Appl. No.: 280,532

[22] Filed: Jul. 6, 1981

[51] Int. Cl.³ .............................................. G09G 3/00
[52] U.S. Cl. .................................. 340/712; 340/706; 340/365 VL
[58] Field of Search ........... 340/712, 711, 706, 365 C, 340/365 VL

[56] References Cited

U.S. PATENT DOCUMENTS

| 3,200,375 | 8/1965 | Lutz | 340/365 VL |
| 3,350,705 | 10/1967 | Bendicsen | 340/756 |
| 3,387,084 | 8/1968 | Hine et al. | 340/705 |
| 4,185,281 | 1/1980 | Silverstone | 340/706 |
| 4,242,676 | 12/1980 | Piguet et al. | 340/365 C |
| 4,365,243 | 12/1982 | Perotto et al. | 340/712 |

Primary Examiner—Marshall M. Curtis
Attorney, Agent, or Firm—McCaleb, Lucas & Brugman

[57] ABSTRACT

A simplified data entry system, particularly for a lawn sprinkler timer, employing three data entry push buttons cooperative with a multiple position mode switch having manual selector controls operable to present various program modes or segments and associated display legends, one by one, to a data display and entry station; the mode switch positively restricting data entry to the particular requirements of the mode indexed to the entry station and limiting input thereto in accordance with its program requirements; such input data being supplied by push button depressions, which cooperate with a micro-computer to advance digits in a multi-digit display.

7 Claims, 4 Drawing Figures

DATA ENTRY SYSTEM FOR MICRO-COMPUTER BASED CONTROLLERS

BACKGROUND OF THE INVENTION

An increasing number of consumer appliances and industrial processes are controlled by micro-computers or micro-processors, many of which receive data input from the user to modify or control the process or appliance.

One of the more commonly used data entry systems for this purpose employs a keyboard and a multi-digit segmentized display. For example, a microwave oven controller employs characters which are entered on the keyboard and appear on a display to represent such factors as current time of day, set point time, cooking duration, heating power level and temperature. In some instances an error message is also available to indicate an invalid input, such as 28:74 o'clock. To still further complicate the matter, there may be one mode for the entry of data and another mode for review of data previously entered. While it is possible, through training, for an operator of a microwave oven, for instance, to master the data entry regimen, particularly if the operator uses the microwave oven daily, other appliances may have data entered less frequently and therefore require a session with an instruction book each time data is to be entered.

One example of such a less frequently used system is found in a lawn sprinkler system controller, in which, starting times, sprinkling area sequence, and duration may be set at the start of a lawn watering season and remain unaltered for several months.

Suffice it to say that the above referred to calculator based data entry systems under current practice may be overly complicated and difficult to learn in certain cases, thereby presenting inconvenience and problems to the user.

The present invention seeks to overcome the above outlined difficulties currently encountered with calculator based data entry systems and is particularly directed to improvements in data entry systems used with micro-computer based controllers and the like.

In brief, this invention employs push-button data entry switches which cooperate with the micro-computer to roll a digital display, similar to setting the time on a digital electronic clock. Each of the push-button switches advances one or two digits of the multiple digit display groupings or pairs. Each digit pair is designed to roll back to a minimum count after reaching a maximum count. The several push buttons are positioned conveniently adjacent an opening in a display panel at which a single display is visible along with an appropriate visual legend for displaying a particular selected program mode. A plurality of such program modes are available and their associated legends are selectively positioned opposite the display window for data entry or review by means of a manually operable mode switch having a movable member carrying a series of mode legends selectively visible at the display window. Movement of the mode switch to present a desired legend at the display window automatically accomplishes several things. It presents the desired register or program mode to be displayed and/or modified by data entry, it restricts data entry to the selected program mode and it limits the minimum and maximum number of roll over counts which may be entered and displayed in accordance with the selected register requirements.

As a result of this sytem, it is impossible to enter data into the wrong register and data entry to a selected register is automatically restricted according to its input requirements.

It is a particular object of this invention to provide an improved and simplified data entry system for use with micro-computer or micro-processor based controllers and the like.

Another object of this invention is to provide a data entry system for computer controllers utilizing a minimum number of input switches in conjunction with a multi-position selector switch capable of presenting a plurality of program modes or registers to an input station whereat each mode of the program may be selectively modified to the exclusion of all others.

Still another object of this invention is to provide an improved data entry system utilizing a minimum number of push-buttons operable with a single or common visual display and means for selectively conditioning a plurality of program registers for data input, modification or review.

The above and further objects, features and advantages of this invention will be recognized by those familiar with the art from the following detailed description of a preferred embodiment thereof illustrative of its concepts and illustrated in the accompanying drawings; such embodiment representing the best mode presently contemplated for carrying out the teachings and concepts of this invention.

IN THE DRAWINGS

DESCRIPTION OF THE PREFERRED EMBODIMENT

Figure 1:
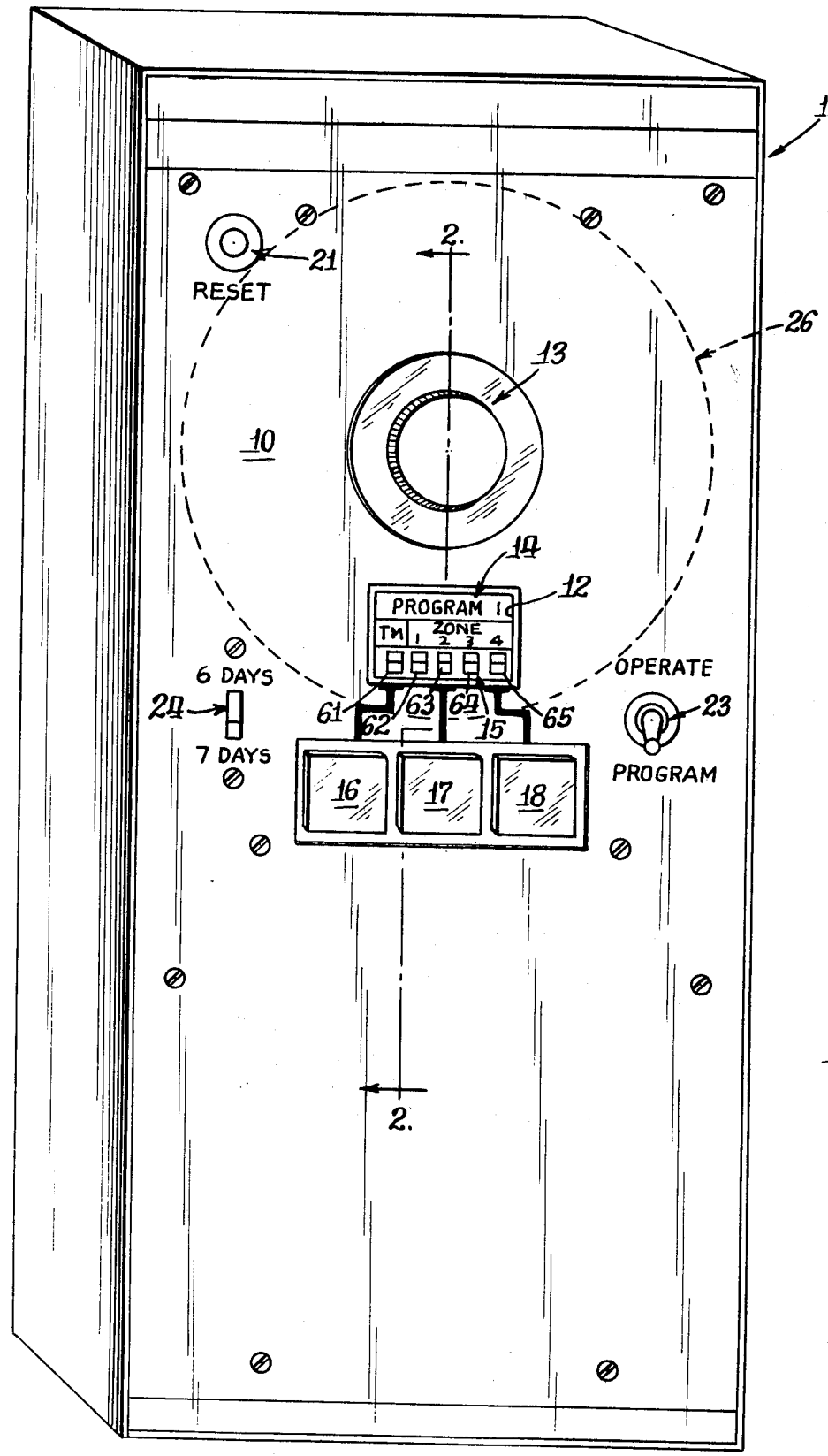
FIG. 1 is a perspective view of a lawn sprinkler control unit embodying the data entry system of this invention.

Turning now to the specifics of the illustrated embodiment shown in the drawings, initial reference is made to FIG. 1 showing a control unit for a lawn sprinkler timer embodying the improved data entry system of this invention.

As there shown, the front panel 10 of a control unit, indicated generally by numeral 11, is distinguished by a central window opening 12 adjacent to which is located a manually engageable selector control knob means 13 which, in this instance, is rotatable to present a plurality of program legends 14 at window 12. Also visible at the window 12 is a digital display 15. Immediately beneath the digital display are three aligned data entry push buttons 16, 17 and 18. Certain other controls also are available to the operator such as a "re-set" button 21; an "operate and program" selector switch 23 and a "day" selector switch 24 which provides either six-day or seven-day cycle selection as desired.

This invention primarily concerns the three data entry push-button switches 16-18, the digital display 15, the legends 14 and associated manual selector control knob 13 and its related mechanisms, as will appear presently. The other named items, while convenient to the overall operation of the lawn sprinkler timer, are ancillary to the present invention and will not be described in great detail hereinafter except as they may pertain to the description and understanding of the current invention.

Figure 2:
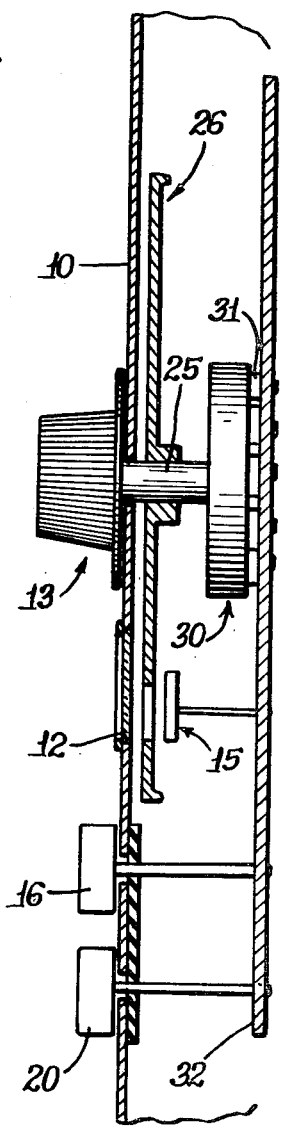
FIG. 2 is a cross-sectional view taken substantially along vantage line 2—2 of FIG. 1 and looking in the direction of the arrows thereon.
Figure 3:
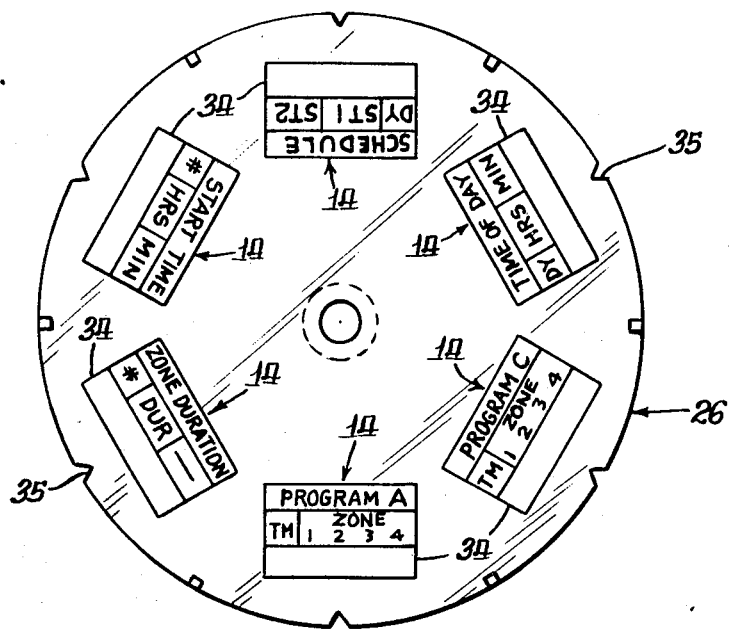
FIG. 3 is a plan view of the legend disc shown in FIG. 2.

Dwelling first on the manual selector knob 13 and its associated mechanism and means including the legend 14, reference is made to FIGS. 2 and 3 of the drawings for a better understanding of this aspect of the current invention.

As shown in FIG. 2, the selector control knob 13 is mounted over the control panel 10 at the upper or outer end of a switch shaft 25 which extends through panel 10 and carries a movable disc or member 26 which is disposed in spaced parallelism immediately beneath panel 10 and carries the legend means 14 thereon.

Figure 4:
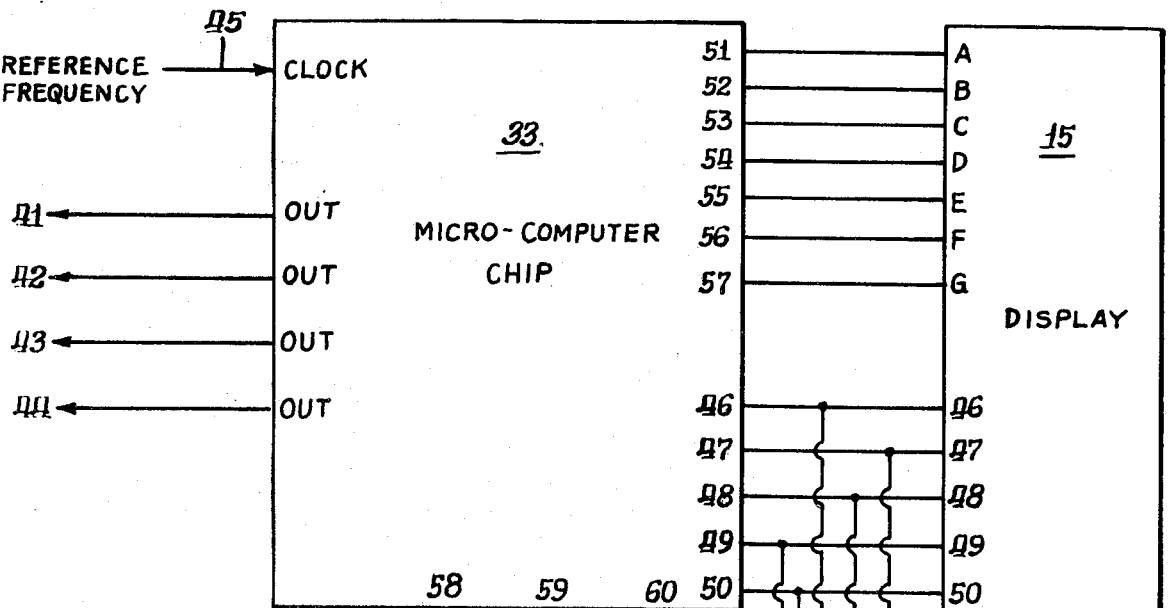
FIG. 4 is a partial schematic circuit diagram of the data control.

At the lower end of the switch shaft 25 is a multiple-position mode switch 30 having plural contacts 31 engageable with corresponding contacts coupled to a printed circuit board 32 mounted within the housing 11 and having circuit connection with a suitable microprocessor chip 33 capable of carrying out the desired program functions for the illustrative lawn sprinkler timer (see FIG. 4). Typically, chip 33 may constitute a National Semi-Conductor COPS 400 Series or a Texas Instruments TMS-1000 type.

An LED or other type digital display 15 is located and supported immediately beneath the legend disc 26 and opposite the aperture or window 12 in the control panel 10 as to be visible to the user. In the particular illustrated embodiment, the display 15 comprises a five digit, seven-segment array with digital input thereto being accomplished through the micro-computer and manipulation of the various push-button switches 16–18 which also are mounted beneath the panel 10 and project upwardly therethrough for manual engagement by the operator.

As best shown in FIG. 3, the mode disc 26 which is movably driven in response to rotation of the control knob 13, bears a number of radially spaced legend means 14 (six in the illustrated case) on its upper face. Disc 26 also is provided, immediately adjacent each of the legend means, with an elongated opening 34 designed to register over the display 15 as each of the legends is brought into registration with the window 12. The disc 26 also has six detent indentations or notches 35 in its perphery, spaced 60 degrees apart and engageable with an appropriate spring loaded keeper (not shown) whereby the various indexed position of the disc may be maintained to present a corresponding legend at window 12.

It is specifically contemplated that while the herein illustrated embodiment shows a disc 26 responsive to rotational actuation of the knob means 13, the same also may comprise a linearly movable strip, for example, or other shaped member capable of being moved to bring the various legends opposite the display window.

As diagramed in FIG. 4, the micro-computer 33 has four outputs 41–44 which serve to drive relays or other equivalent means such as thyristors for controlling solenoid operated water control valves (not shown) associated with four watering zones of an undergound sprinkler system in a known manner. Each zone may be programmed for 0 to 99 minutes of sprinkling time with the four zones normally sprinkled in sequence for each watering cycle. The day of the week and the cycle start time are also programmed in the chip 33, as will appear presently.

A reference clock input 45 to the micro-computer 40 provides reference frequency for controlling all timing functions and its internal time of day clock. Five digit drive inputs 46–50 serve the digital display 15 along with seven-segment digital inputs 51–57, as supplied by the chip 33. The digit drives 46–57 also serve to drive the push-buttons and the multi-position mode selector switch 30 to control data inputs 58, 59 and 60 for the computer chip.

As illustrated in FIG. 4, the auxiliary control means previously mentioned, such as re-set button 21, the "Operate Program" selector switch 23, and the day cycle selector switch 24 also control inputs to the computer chip in order to carry out their appropriate functional control of its program and operation.

With particular reference to the five digit display 15, it will recognized from FIG. 1 that the first or left hand digit display 61 comprises a normal seven-segment display, which is controlled by the first push button 16. The next pair of digit displays 62 and 63 are controlled by push button 17 and the fourth and fifth digit displays 64 and 65 thereof are controlled by push button 18.

USE AND OPERATION

It will be understood from the six legends which appear on disc 26, as illustrated in FIG. 3, that the mode switch 31 has six selected positions. In order to modify or display the program, switch 23 is placed in "program" position. If the entire program is to be re-set, then the re-set button 21 is depressed. To enter data, each of the selected modes of the program, as dictated by the several legend positions of the mode switch 30, are successively positioned opposite the display window 12, automatically providing the operator with the appropriate legends for data entry and review for the thusly selected mode.

Each of the three push-button switches 16, 17 and 18 serves to advance the number in one or two digits of the display as previously mentioned, so that upon pushing a selected one of the buttons, the corresponding display digit advances one count. If the button is retained in a depressed condition, after delay of approximately one quarter of a second, the display digit or digits controlled thereby continually advance at a rate of fifteen counts per second. Consequently, any digit or pair of digits may be advanced and controlled with single counts by a series of short pushes of a control button or continuously by retaining the respective button in a depressed condition. Each digit or each pair of digits, as the case may be, will roll back to a minimum count after reaching its maximum count; such minimum and maximums being set by the mode switch 31 for each of its mode or program register positions.

TIME-OF-DAY

Although any of the six available modes may be set in any desired order, the "time-of-day" will first be considered. This mode is brought about by indexing the "time-of-day" legend opposite window 12. This permits the operator to set in the day of the week, the hour of the day, and the minute of the hour as shown on the legend. The left digit rolls from seven to one for the days of the week; the center digit pair rolls from twenty-three to zero and the right digit pair rolls from fifty-nine to zero. By setting the day with push button 16, the hour with push button 17 and the minutes with push button 18, it is impossible to enter an improper or non-clock time.

Having set up the time of day, which is similar to setting a digital clock as above explained, the mode selector switch and particularly the control knob 13 thereof is then rotated to present another legend to the display window.

SCHEDULE

The schedule legend tells the operator that there are three entries to be made, namely the week day and a selection of program "A" or "C" or neither. The days of the week, one through seven, are indicated in the first single digit grouping controlled by push button 16, unless the day selector switch 24 is placed on the six-day schedule, in which event the digit entry into the first display will roll from one through six only. The operator, starting with day one, pushes the push-button control 16 until 1 appears in the display window. The next two-digit groups are then utilized to indicate which of the two available programs are to be utilized on that particular day, or if none is to be used. For this purpose a single digit of the two-digit pair 62, 63 controlled by push button 17 is employed and button 17 is pushed once or twice to display A or O, indicating the selection of program A or none. Next button 18 is pushed once or twice to indicate the selection of program "C" or none in the display digit pair 64, 65. It is to be recognized that the positioning of the mode switch to present the "schedule" legend at the display window automatically limits the minimum and maximum number of digits which may be entered in this mode. The foregoing procedure is carried out for the remaining week days 2 through 6 or 7. Review is accomplished by pushing button 16, to cycle through the days of the week. After setting the scheduled programs, the display is left to display the appropriate day of the week.

START TIME

When the mode switch is indexed to the "start time" position, indicating the time of day for starting programs A or C, digits 1 or 2 are indicated in the first digit display 61 by pushing button 16 and time is entered in digit displays 63–65 exactly the same as the "time of the day" mode above described. Review of the start time settings may be accomplished by merely turning the mode switch to present the "start time" legend at the display window and pushing the left button 16 for programs A and C, whereupon the previously entered cycle start time of each of the two available programs will automatically appear in the display opposite each of the indicated programs.

ZONE DURATION

Indexing the mode switch to "zone duration" permits the operator to limit the number of minutes water is to be applied or sprinkled within each of four watering zones in accordance with the current illustrative case. In this mode, the display is programmed for a three digit display with the zone number 1, 2, 3 or 4 being entered in the left digit display 61 controlled by push button 16. The time in minutes, from zero to ninety-nine, is entered in the middle digit pair 62 and 63 by the push button 17. As before, the positioning of the mode switch automatically limits the minimum and maximum number of digits and which digit displays are available for utilization in the display, thereby avoiding possible error. In this particular mode, as an example, the operator would set in a time from zero to ninety-nine minutes in display sections 62 and 63 opposite each of the zone numbers one through four in display section 61. Push button 18 is not used in this mode setting. Review of the data entry is accomplished very simply by dialing the mode switch to "zone duration" and exercising the push button 16 through the four zones 1, 2, 3 and 4 whereupon the previously set duration times for each of the respective zones will appear in the middle two digit windows 62 and 63.

PROGRAMS A AND C

The "program A" and "program C" mode positions for the mode selector are alike and utilize all five digits of the display. In the particular illustrative instance, the provision of two program modes and two start times permits selective setting of sprinkler operations in each of the four available sprinkler zones at either or both of the two previously set start times, as for example, morning and afternoon sprinkling.

The four zones indicated by the legend for the four digit sections of the display are set either at 0 for "no" or a 1 for "yes"; indicating whether or not that particular zone designate is to be active in the sprinkler program, at one, both or none of the designated start times.

With the "program A" mode set as above described, "program C" is similarly set to cooperate with the ramifications of program A. For example, "program A" may be all morning sprinkling and "program C" all afternoon or evening sprinkling.

As previously indicated, the six described modes provided by the selector switch, may be set in any desired order, for example, an operationally preferred order is Zone Duration; Program A; Program C; Start Time; Schedule and Time of Day.

Having thus described the present invention, it is believed that those familiar with the art will readily recognize its improved advancement over the prior art and appreciate that while the same has herein been described in relation to a particular preferred embodiment of its features, the same is susceptible to modification and substitution of equivalents without departing from its inventive scope as defined in the following appended claims

The embodiments of the invention in which an exclusive property or privilege is claimed are defined as follows:

1. In a data entry system for use in programming a micro-computer, the combination comprising: a display panel having a window opening therein, digital display means mounted behind said panel and operably visable through said window opening, a member having plural data entry legend means mounted for movement across said window opening, manually operable means for moving said member across said window opening whereby to selectively present each said legend means thereon, one at a time and in any desired order or sequence, at said window opening in cooperating visual adjacency with said display means, and means actuated simultaneously with movement of said member by said manually operable means for enabling data entry for an individual program mode restricted to a selected legend means positioned adjacent said display means, whereby data for said mode may be entered in the micro-computer and visually recorded on said display means in correlation with said selected legend means.

2. The combination of claim 1, wherein said member is a rigid plate movable over said display means and having openings adjacent said legend means thereon and through which said display means is visable when each legend means is adjacent said display means.

3. The combination of claim 1, wherein said means for enabling data entry comprises multi-position mode switch means operably positioned with and according to the positioning of said member.

4. The combination of claim 3, and manually engageable data entry push button means having circuit connection with the micro-computer for entering program data therefor and activating said display means.

5. The combination of claim 3, wherein said multi-position mode switch means is operable to present a single program mode for data entry at each of its several operating positions thereby excluding simultaneous data entry for any non-selected mode position thereof.

6. The combination of claim 5, wherein review of data entered for the individual program modes is available by selectively positioning a desired mode legend opposite said window to activate the associated display means and thereby present previously entered mode data thereon.

7. The combination of claim 3, wherein said member and mode switch means are conjointly rotatable in response to operation of said manually operable means.

* * * * *